United States Patent [19]

Eich et al.

[11] Patent Number: 5,023,859

[45] Date of Patent: Jun. 11, 1991

[54] OPTICAL DATA STORAGE APPARATUS AND METHOD UTILIZING AN AMORPHOUS POLYMER WHICH EXHIBITS PHOTOCHROMIC PROPERTIES

[75] Inventors: Manfred Eich, Frankfurt am Main; Norbert Rau, Sulzbach; Joachim Wendorff, Nauheim, all of Fed. Rep. of Germany

[73] Assignee: Rohm GmbH Chemische Fabrik, Darmstadt, Fed. Rep. of Germany

[21] Appl. No.: 330,463

[22] Filed: Mar. 30, 1989

[30] Foreign Application Priority Data

Mar. 30, 1988 [DE] Fed. Rep. of Germany ....... 3810722

[51] Int. Cl.$^5$ .............................................. G11B 7/00
[52] U.S. Cl. .................................... 365/113; 365/119; 369/100; 369/101; 430/270; 430/18; 430/19
[58] Field of Search ....................... 365/106, 113, 119; 369/100, 101; 346/135.1, 766; 430/270, 19, 18

[56] References Cited

U.S. PATENT DOCUMENTS 3,697,528 10/1972 Andrews et al. .................... 546/258
4,702,945 10/1987 Etzbach et al. ......................... 428/1

FOREIGN PATENT DOCUMENTS 119343 4/1976 German Democratic Rep. .

Primary Examiner—Robert L. Richardson
Attorney, Agent, or Firm—Oblon, Spivak, McClelland, Maier & Neustadt

[57] ABSTRACT

A device for reversible optical data storage, comprising polymer film, the film comprising an amorphous polymer capable of photochromic isomerization, whereby data is reversibly stored in said polymer film and may be read by illuminating the isomerized polymer film with a light source.

30 Claims, 3 Drawing Sheets

OPTICAL DATA STORAGE APPARATUS AND METHOD UTILIZING AN AMORPHOUS POLYMER WHICH EXHIBITS PHOTOCHROMIC PROPERTIES

BACKGROUND OF THE INVENTION

1. Field of the Invention

The invention relates to a device for reversible optical data storage, using amorphous polymers in a tough and resilient state and in a vitreous solidified state.

2. Discussion of the Background

In addition to a solid crystalline state and a liquid melt state, polymer systems in a limited range of temperatures can have a highly viscous, tough and resilient state and at lower temperatures the solid, vitreous solidified state. By means of suitable chemical composition of the polymer molecules or by means of suitable adjustment of the chain length of the molecules, the tendency to form these states can be increased. Homopolymers, copolymers, branched polymers and cross-linked polymers have an equivalent tendency to form said states. (See H.G. Elias, Makromoleküle, Huthig and Wepf Verlag, Basel; B. Wunderlich, Macromolecular Physics, Academic Press, New York, 1973).

The existence of the vitreous solidified state can be characterized, for example, by means of calorimetric or dilatometric analysis methods. At the transition of a glassy state into the tough and resilient state, the specific heat and the coefficient of thermal expansion increase sharply. The temperature range for the existence of the tough and elastic state can be determined by means of rheological methods or dynamic-mechanical analysis methods (See D. W. van Krevelen, Properties of Polymers, Elsevier Scientific Publishing Company, Amsterdam, 1976; H. G. Elias, loc., cit; B. Wunderlich loc. cit).

With respect to their structure, the tough and resilient state and the vitreous solidified state are generally characterized by the fact that there is no periodic, crystalline arrangement of the molecular groups and that the molecular groups have a statistical orientation. This is true as long as no liquid crystalline polymers are considered and as long as during cooling, no external electric, magnetic or mechanical fields act on the system.

In the simplest case, the orientational order of the tough and resilient or vitreous solidified state can be characterized by means of the orientation order parameter $f_\theta$. (See P. G. de Gennes "The Physics of Liquid Crystals"0 Clarendon Press, Oxford, 1974; W. H. de Jeu, Physical Properties of Liquid Crystalline Materials, Gordon and Breach Science Publishers, 1980). In this case the orientation parameter is defined as follows:

$$f_\theta = \tfrac{1}{2} <3\cos^2\theta - 1>$$

wherein $\theta$ is the angle between the longitudinal axis of the molecular group (segment of the chain) and a preferred direction. The value of this order parameter is 1 for a complete, perfectly parallel arrangement of all molecular groups and zero for a statistical orientation distribution. This value is generally observed for the tough and resilient and the glass-like solidified state of amorphous polymers and is, in particular, homogeneously observed for the entire sample. (See F. Bueche, Physical Properties of Polymers, Interscience, New York, 1962).

The density is also homogeneous for the entire sample and, in particular, not only for the vitreous solidified state but also for the tough and resilient amorphous state. It follows directly that optical properties, such as the refractive index and the double refraction, are homogeneous for the samples, whereby in the case of amorphous polymers the amount of double refraction is uniformly zero. Consequently polymers are transparent in both of these states; and under crossed polarization, both of the states appear black. The wide spread use of amorphous polymers in industrial products such as films, photoconductors, special glasses or industrial glazing materials is based on these special optical properties.

Recently a number of industrial uses of amorphous polymers in the tough and resilient and vitreous solidified states have become known in the field of optical storage. Thus, recently a number of photopolymers have been proposed for recording phase holograms. (See P. Hariharan, Optical Holography, Cambridge, University Press, 1984; Sh. Reich, Angew. Chemie, Vol. 89, 467, 1977; H. M. Smith, Holographic Recording Materials, Springer Verlag, Berlin, 1977; W. Driemeier, M. Kopietz, M. D. Lechner, Colloid Polym. Sci., 264, 1024, 1986). In this case, they are blends of monomers or oligomers with light sensitive catalysts. The active mechanism for information storage is based on the fact that the refractive index changes with the molecular weight. A local non-homogeneous light distribution produces a non-homogeneous polymerization and induces thereby, a non-homogeneous distribution of the refractive index. In an analogous manner the refractive index can be spatially varied by means of photochemical cross-linking. (See Sh. Reich, loc. cit). An important drawback of this method is that it involves an irreversible information storage and that diffusion processes occur due to the presence of molecules having varying chain lengths, which result in a negative impact on the optically stored information.

Furthermore, in the literature, the possibility of writing optically accessible information (by means of embossing amorphous polymers) into the surface of amorphous polymers is described. This process is used in the case of compact disc ROM's or audio-compact discs. It has the drawback that data cannot be erased or recorded again. (See J. Hennig, Kunststoffe, Vol. 75, 7, 1985, Philips Technical Review, Vol. 40, 6, 1982).

A process is also reported that starts from dye-doped amorphous polymer films, which when applied to suitable systems permit information to be optically recorded in the form of holes or bubbles. Even this process does not permit data to be erased or rewritten. (See M.Law, D. Johnsen, J. Appl. Phys., Vol. 54, 9, 1983).

The photochemical hole burning method makes use of the selective bleachability of the absorption lines of dye molecules in amorphous polymer matrices. The starting point is the non-homogeneous broadening of spectral lines through "side resonances", in which at low temperatures, frequency holes with high information density can be reversibly recorded. This process has, among others, the drawback that it requires low temperatures when writing, storing or reading (See A. Gutierrez, J. Friedrich, D. Haarer, H. Wolfrom, IBM Journal of Research and Development, Vol. 26, 2, 1982).

Other storage methods, based on thermoplastic polymers, are based on the deformability of the polymer surface under the influence of electrostatic forces. The resulting surface relief then serves as a phase modulator for a transmitted or reflected illuminating wave. The required surface load picture is generated by means of a sandwich constructed of a thermoplastic, photoconductor, and conductor, on which the two dimensional optical information is exposed. In this case, the optical information can be erased and rewritten again. The drawback of this process is the quite complex construction of the sandwich and the fact that the entire write—erase procedure requires several complicated process steps. (See H. M. Smith, Holographic Reading Materials).

Now, as before, there is a great interest in optical storage media, which have not only high recording densities but also the possibility of reversible storage of information. The above described solutions to the problem of optical data storage in amorphous polymers are relatively narrowly defined engineering solutions. Thus in many cases the data cannot be reversibly stored. In other cases the construction of the storage medium is complex. The processes required for storing are time-consuming or from an engineering point of view, the temperature limitations for the storage medium result in processes which are not very practical.

SUMMARY OF THE INVENTION

Accordingly, one object of the present invention is to provide an optical data storage device in which information may be repeatedly stored and erased.

A further object of the invention is to provide a device for optical data storage and a method for storing and erasing information which can be readily utilized at convenient temperatures.

It has now been found that an especially beneficial form of optical data storage can be achieved through the application of the device of the invention. The invention relates to a device for reversible optical data storage using polymers as the storage medium, whereby the device contains a film made of an amorphous polymer as the storage medium in order to store data by means of a local variation of the molecular order.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
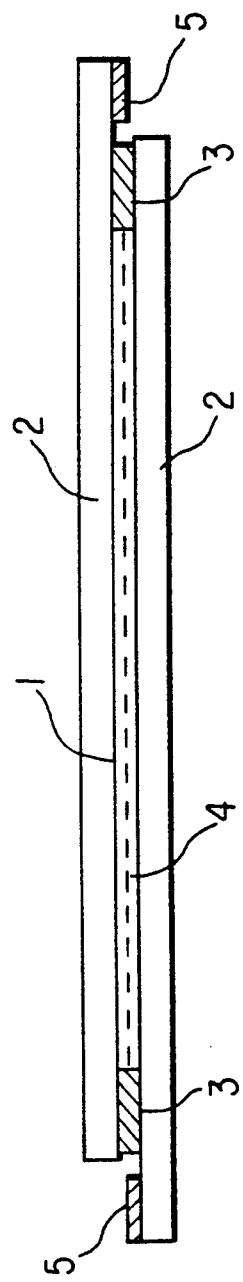
FIG. 1 illustrates a preferred embodiment of the optical data storage device of the present invention.

Preferably the variation of the molecular order is achieved by means of irradiation of light, especially by means of a laser beam. Generally the process runs in such a manner that the optical information is stored by means of a laser beam through a local reorientation or disorientation of the molecular segments. Preferably the storage medium is a part of the storage device. This device is set up for reversible storage of data using an optical method by means of selective variation of the spacial order/orientation of amorphous polymers. The function of the storage process is based on a photo-induced change in the suitable molecular groups, which are built into the main chain of the polymer as backbone groups or as side groups. (See C. D. Eisenbach, Polymer, Vol. 21, 1175 (1980); G. H. Brown, Photochromism in "Techniques of Chemistry", Vol. 3, J. Wiley, New York, 1971, G. Smets in "Advances in Polymer Science", Vol. 50, Springer Verlag, 1983). The term "photochromic isomerism" as used herein means: the ability of a substance to experience an isomerization due to an interaction with electromagnetic radiation. The photochromic substance can be a low molecular weight compound or preferably bonded within the polymer.

Photochromic polymers, which are capable of (geometric) isomerization and are based on corresponding monomers have been described a number of times, for example, NL-A 66 13 881, JP-A 71-14,905 (Chem. Abstr., 75, 64617n); JP-A 73-06198 (Chem. Abstr., 79, 13, 7671v), JP-A 60-192712 (Chem. Abstr.104 197 694z), JP-A 58-40103 (Chem. Abstr., 99, 123534d), H. S. Blair et al, Polymer, 25, (9) 1347-52 (1984); C. D. Eisenbach, Makromol. Chemie 18, (2) 565-571 (1979), JP-C 83-40503 (Chem. Abstr., 99, 123534d).

Representative of the group of acrylazines include, for example, compounds according to JP-A 74-111995 (Chem. Abstr., 82, 98807j and DDR-A 119 343). Representative compounds of the group of stilbenes are disclosed in F. Mikes et al., Die Makromol. Chemie, 75, 2375 (1974). Representative compounds of the group of spirobenzopyrans are disclosed in JP-OS 70-28893 (Chem. Abstr., 75, 6827v); M. Kikuchi et al, Nippon Kagaku Kaishi 1972, 1323-30 (Chem. Abstr., 77, 140645d); Verborgt et al., J. Polym. Sci., Polym. Chem. Ed., 2511-23 (1974), (Chem. Abstr., 82, 98628b); G. Smets et al., Pure Appl. Chem., (5), 845-856, (1978); E. I. Merkulov et al., Irv. Akad Nauk SSSR, Ser. Khim, (3), 706-8, (1976) (Chem. Abstr., 85, 21992v). U.S. Pat. No. 4,405,733 discloses representatives of the group of compounds which contain units of mercury thiocarbazonate such as disclosed in H. Kamogawa, J. Polym. Sci. 9 (A1) 335 (1971).

Representative of the group of fulgides are, for example, described in H. G. Heller, Spec. Publ.-Royal Society of Chemistry, 60, 121-135 (1986).

The variation of molecular geometry that accompanies the photophysical process and the induced local non-equilibrium states of the amorphous polymer films that are related to this variation are critical to the present invention. Locally the changes in geometry cause variations in the optical properties such as refractive index, double refraction or absorption properties, by means of variations in the density or orientation. The recorded optical information can be erased by a thermally induced reverse relaxation.

The temperature of the storage medium, at which the information is stored, can be in the range of the solid, vitreous solidified state, thus at a temperature below the glass temperature. Alternatively, the temperature of the storage medium at which the information is stored can be selected in such a manner that there is a tough and resilient state. The resulting macroscopic, anisotropic area is then frozen below the glass temperature. The generated scattering centers or reorientation areas can be read as optical information. (See E. A. Turi, Thermal Characterization of Polymeric Materials, p. 169 ff, Academic Press, New York, 1981, to determine the glass temperature Tg).

The Amorphous Polymers:

Polymers useful in the present invention generally have the following characteristics:

a) The chains are constructed completely or partially from suitable photosensitive molecular components, and b) The chains are amorphous. Within the meaning of the present invention, an amorphous state is understood to mean the absence of a crystalline order in the relevant proportions.

The polymers can be pure main chain polymers, polymers with side groups or branchings; block polymers; or cross-linked polymers. The requirements concerning the chemical structure of the amorphous polymers of the cited orientation process are described in the literature (See H. G. Elias, loc. cit; D. W. van Krevelen, loc. cit; B. Wunderlich, loc. cit; F. Buechi, loc. cit). The tendency to form a crystalline structure, which is undesirable in the present invention, can be targeted and successfully reduced through the use of chain molecules of high molecular weight, use of statistical copolymers, the preparation of atactic polymers, the introduction of short chained branchings, or cross-linking.

Thus the amorphous polymers of the invention contain photosensitive molecular components of molecular groups either in the side groups or within the backbone of the chain or in both. Usually these photosensitive molecular components or groups are based on one or more monomers of the formula $$R\text{—}PH$$

where PH is a photosensitive unit, preferably selected from the group comprising or containing azobenzene, bisazobenzene, trisazobenzene, and azoxybenzene, as well as alkyl substituted derivatives of the same, stilbene or spiropyran groups, and where R stands for a group which enables the chemical bonding of the photochemical unit into the macromolecule, usually a group that is capable of polymerization or polycondensation, in particular radical polymerization. Examples of substituted derivatives are compounds which exhibit the I-effect (See E. S. Gould, Mechanism and Structure in Organic Chemistry, New York, Holt Rinehard & Winston, 1960, p. 207), in particular —CN, —NO$_2$, and —COOR$_2$ groups where R$_2$ is a hydrogen or an alkyl group.

In the monomers R—Ph, R denotes a group derived from acrylic or methacrylic acid $$\underset{\phantom{CH_2=}}{CH_2}=\overset{R_1}{\underset{|}{C}}-\overset{O}{\underset{\|}{C}}-Y-(A)_n-(Z)_m$$

where R$_1$ stands for hydrogen or methyl, Y stands for oxygen or a group —NR$_2$—, R$_2$ denotes hydrogen or an alkyl group having 1 to 6 carbon atoms and A stands for a spacing unit (spacer), preferably a —(CH$_2$)$_r$—group, n and m stand for zero or one and r stands for a number from 1 to 12. Z is a bonding group, preferably selected from the functions —O—, —NR$_2$—, $$-O-\underset{\|}{\underset{O}{C}}-,\ -\underset{\|}{\underset{O}{C}}-O-,\ -O-\underset{\|}{\underset{O}{C}}-O-,\ \text{and}\ -\underset{\|}{\underset{O\ R_2}{C}}-\underset{|}{N}-.$$

A change in geometry under the influence of light of a suitable wavelength can be used as the selection criterion for the suitability of the photosensitive molecular components, for example, a cis-trans conversion or ring opening.

Representatives of monomers with photosensitive molecular components are, for example, components having a stilbene configuration, having an azobenzene configuration, or with a fulgide configuration.

The photosensitive polymers can be prepared as follows. Conventional monomers, preferably radically polymerizable monomers, can serve as the comonomers. Attention should be paid to the amorphous character of the copolymer that is formed. In particular, monomers (M) having the formula $$\underset{\phantom{H_2C=}}{H_2C}=\overset{R_1'}{\underset{|}{C}}-Q \qquad (M)$$

are used, where R$'_1$ has the same meaning as R$_1$ and where Q stands for a group $$-\underset{\|}{\underset{O}{C}}-Y-R_3$$

where R$_3$ denotes hydrogen, a cyclic alkyl group having 1 to 18 carbon atoms or a substituted aryl group, in particular a phenyl group or substituted phenyl group having up to 18 carbon atoms or Q is a group (R)$_n$, where R is a methyl or ethyl group and n is zero, one or two, or Q is hydrogen, methyl, fluorine, chlorine or a conjugated, unsaturated group that may be chlorine-substituted and that has 2 to 4 carbon atoms, or Q is CN, or Q is a heterocyclic group, preferably a five or six membered ring group that has a minimum of one and a maximum of three nitrogen atoms in the group and where the group may have one or two oxygen atoms, which may be carbonyl oxygen, or Q is a group —OR$_4$, where R$_4$ stands for an alkyl group having 1 to 20, preferably 1 to 6, carbon atoms or a group —OCOR$_4$. (See also Ullmann's Encyclopadie der technischen Chemie, 3rd edition, Vol. 14, Urban & Schwarzenberg, Munich, 1963, pp. 108-109.

Generally the amorphous polymers contain a minimum of 20 mole % and a maximum of 99.9 mole % of the comonomers M, preferably 50 to 90 mole %, and in particular 75±10 mole %, based on the total polymer. The concentration of photosensitive molecular groups in the side chain or within the chain backbone can be monitored by suitably controlling the copolymerization conditions. Especially interesting are the atactic polymers of monomers M, where Q is a —COYR$_3$ group, in particular esters of (meth)acrylic acid.

In particular, monomers M are the methyl-, ethyl-, propyl-, butyl-, pentyl-, hexyl-, n-heptyl-, ethylhexyl-, n-dodecyl-, n-hexadecyl-, stearyl-, cyclohexyl-, phenyl-, benzyl-, β-phenylethyl-methacrylates and the corresponding acrylates, specifically methylmethacrylate.

Generally at temperatures above room temperature the radical polymerization results in the desired atactic polymers by means of known initiators such the peroxide compounds or azo compounds, which as a rule are added in quantities ranging from 0.001 to 0.5% by weight, based on the monomers.

Some examples include dibenzoylperoxide, dilauroylperoxide, ditert.-butylperoxide, azoisobutyronitrile, (See H. Rauch-Puntigam, Th. Volker, Acryl- und Methacryl Verbindungen, Springer-Verlag, Berlin, 1967).

Generally the glass temperature Tg of the amorphous polymers is above −20° C., preferably above 18° C. (See E. A. Turi, loc. cit for the determination of Tg). In the latter case, at room temperature the result is a solid film; at Tg below room temperature, a tough and resilient film. In the case of films formed from emulsion polymerization, the glass temperature Tg is generally not above 60° C.

Amorphous polymers can be prepared according to conventional processes, for example through emulsion polymerization, solution polymerization or polymerization in bulk. (See H. Rauch-Puntigam, Th. Volker, loc. cit).

A preferred form for using the polymers is that of a film, for which reason the preparation in the form of a film-forming, preferably aqueous dispersion is of particular interest.

In preferred embodiments methyl-, ethyl-, n-butyl-, 2-ethylhexylacrylic acid esters, and the methyl- and n-butylmethacrylic acid esters are used as the comonomers for preparing the film-forming polymers as an acrylate base in emulsion polymerization.

As a rule the film is formed by evaporating the solvent, preferably water, and drying. The addition of heat, for example, by means of infrared radiation or in a heating furnace, can also be carried out. During the formation of the film, volatile solvents such as xylene, ethylacetate or ethylene glycol can be used as a flow agent or plasticizer in quantities of less than 10% by weight based on the total batch weight.

The Device

The device of the present invention contains a film made of the amorphous polymer as the storage medium, preferably supported by one or two transparent plates. The device is set up to store information by means of a local variation of the geometry of the chromophoric groups of the storage medium. Thus the device may contain, together with the light source, a heat source with which, the polymer film may be heated. For example, a laser can be advantageously used with the device as a heat source. As a rule the absorption properties of the storage medium are chosen in such a manner that the information can be stored with a laser beam of suitable wavelength and intensity and read with another laser beam of a different wavelength without disturbing the stored information.

The storage medium contains a photochromic substance whose absorption properties overlap the emission wavelengths of the writing laser and with which substance the local variation of the molecular order can be induced. The amorphous polymers for the data storage process contain photochromic groups in the main chain or as side groups, whose typical feature is a geometric change under the influence of light of a suitable wavelength.

The polymer can be used in the form of a thin film, a laminate, or as a coating on a solid or flexible matrix. Preferably the thickness of the film ranges from $10^{-3}$ to $10^{-7}$ m. The glass temperature of the polymer can be above room temperature so that the result is a solid film, or below room temperature so that the result is a tough and resilient film. The same is true in the case of a coating or a laminate.

A macroscopically isotropic state of the film, coating, or laminate can be achieved by pouring from the solution, spin coating, extrusion under suitable conditions or compression molding melted granules. A macroscopically anisotropic state can be produced through deformation when preparing the film, coating or laminate. The same applies to cooling the polymer under the influence of an electric or magnetic field. The orientation is frozen in the vitreous solidified state or fixed for a long period of time in the tough and resilient state.

Process for Data Storage

In principle the information is recorded by means of generating a local geometric disturbance where the photochromic groups are located by means of a polarized light beam, which results in the reorientation of the physical environment of these groups. This applies not only in the tough and resilient state but also in the glassy state. In the case of a macroscopically isotropic original state, reorientation results in anisotropic areas, which have a high double refraction. In the case of a macroscopically anisotropic original state, reorientation results in areas with a modified preferred direction of the molecular groups and thus to modifications in the local double refraction. In both cases the result is a phase object. After the light has been switched off, the modified orientation state freezes. The experimental construction can be accomplished according to M. Eich, J. H. Wendorff, Makromol. Chem., Vol. 186, No. 12, 1985.

Erasing Stored Data

In principle stored data can be erased by increasing the temperature above Tg i.e. to the temperature range of the tough and resilient state. This can be done locally by suitably guiding the light beam or macroscopically by suitably controlling the temperature of the entire film, coating, or laminate. An electrical or magnetic field of suitable strength and direction can be applied or a mechanical orientation process can be carried out.

Other features of the invention will become apparent in the course of the following descriptions of exemplary embodiments which are given for illustration of the invention and are not intended to be limiting thereof.

EXAMPLE

Polarized light techniques can be used by reference to J. Michl., E. W. Thulsterup, Spectroscopy with Polarized Light, VCH-Verlag, 1986.

A. Device and Application

In a preferred embodiment (See FIG. 1) the device of the invention includes a registering cell (1), comprising two plane parallel transparent plates (2), preferably glass or plastic plates spaced generally less than 1 mm apart, preferably approximately 10 μm apart. The base area of the plates ranges from a few cm² to dm². The two interior surfaces of the glass plates (2) were vapor deposited with $InO_2/SnO_2$ so that they were conductive and conductive contact had been made towards the outside. Such prepared glass plates (2) were adjoined with the aid of a temperature stable adhesive, such as a silicone adhesive, in a manner such that a cellular empty space (4) with only one inlet and one outlet each of some mm wide is formed.

The desired space (4) between the two glass plates (2) is achieved by means of two suitable spacers (3) of the correct dimension, preferably made of polyimide plastic. The registering cell also has electrodes (5) After the adhesive has dried, the cell is filled on a heatable device with the amorphous polymer. Due to capillary action, the free cell space is completely filled with the polymer melt.

The amorphous polymer used in the example was a copolymer comprising 75% by weight methylacrylate and 25% by weight of a mesogenic cyanoazobenzene comonomer (see preparation example). Due to the chosen ratio there is no liquid crystalline (L.C.) phase so that the polymer has an amorphous glass domain.

This system was chosen to demonstrate the anisotropic variation of the optical properties with an isotropic polymer when irradiated with polarized light. In the following, the aforementioned orientation and rearrangement effect resulting from the isomerization reaction is documented with this system.

Figure 2:
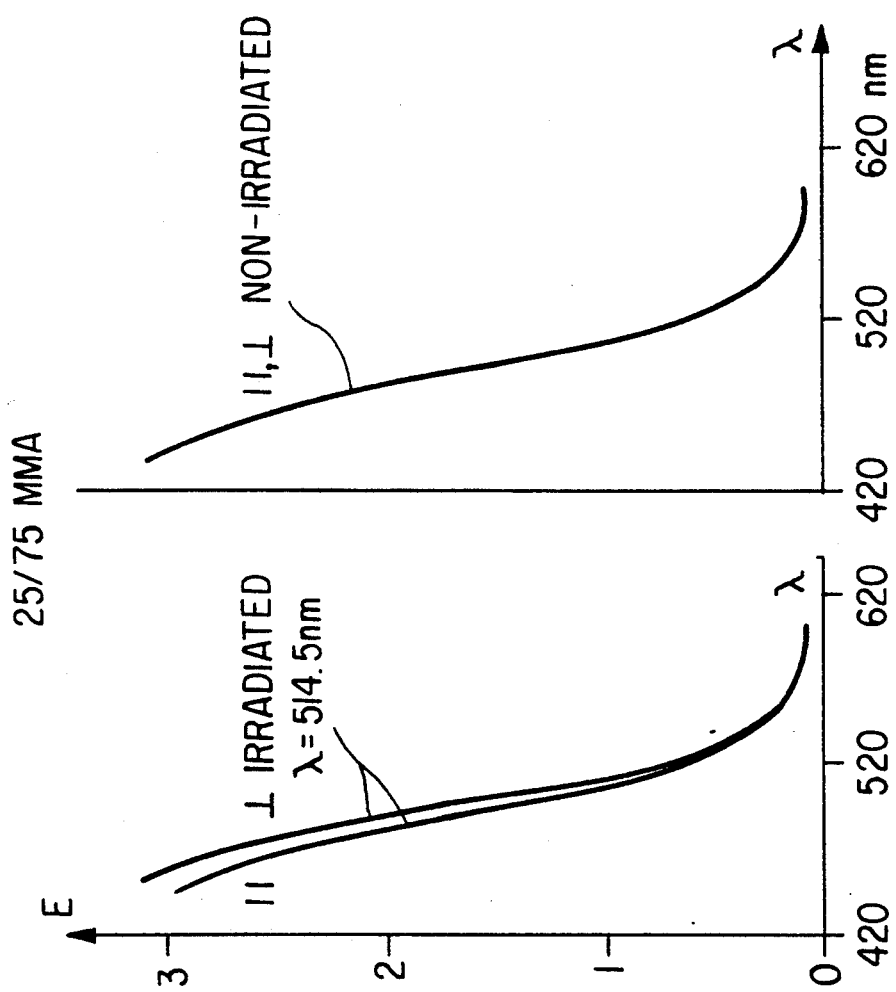
FIGS. 2a and 2b illustrate optically induced dichroism in amorphous polymers.

The right side of FIG. 2 shows the UV-VIS absorption spectrum of the non-irradiated amorphous polymer. A suitable measuring device is described, for example, in DE-A 33 42 040. The curves recorded with orthogonal polarization are superimposable. After irradiation with light having a wavelength of 514.5 nm, the result is an obvious difference in absorption, depending on whether the polarization of the test beam was selected parallel or perpendicular to the light wave used for the irradiation.

It is apparent that the absorption orthogonal to the writing light polarization is greater than when parallel to the polarization of the writing light. Thus it is evident that dichroism was generated through the recording.

Figure 3:
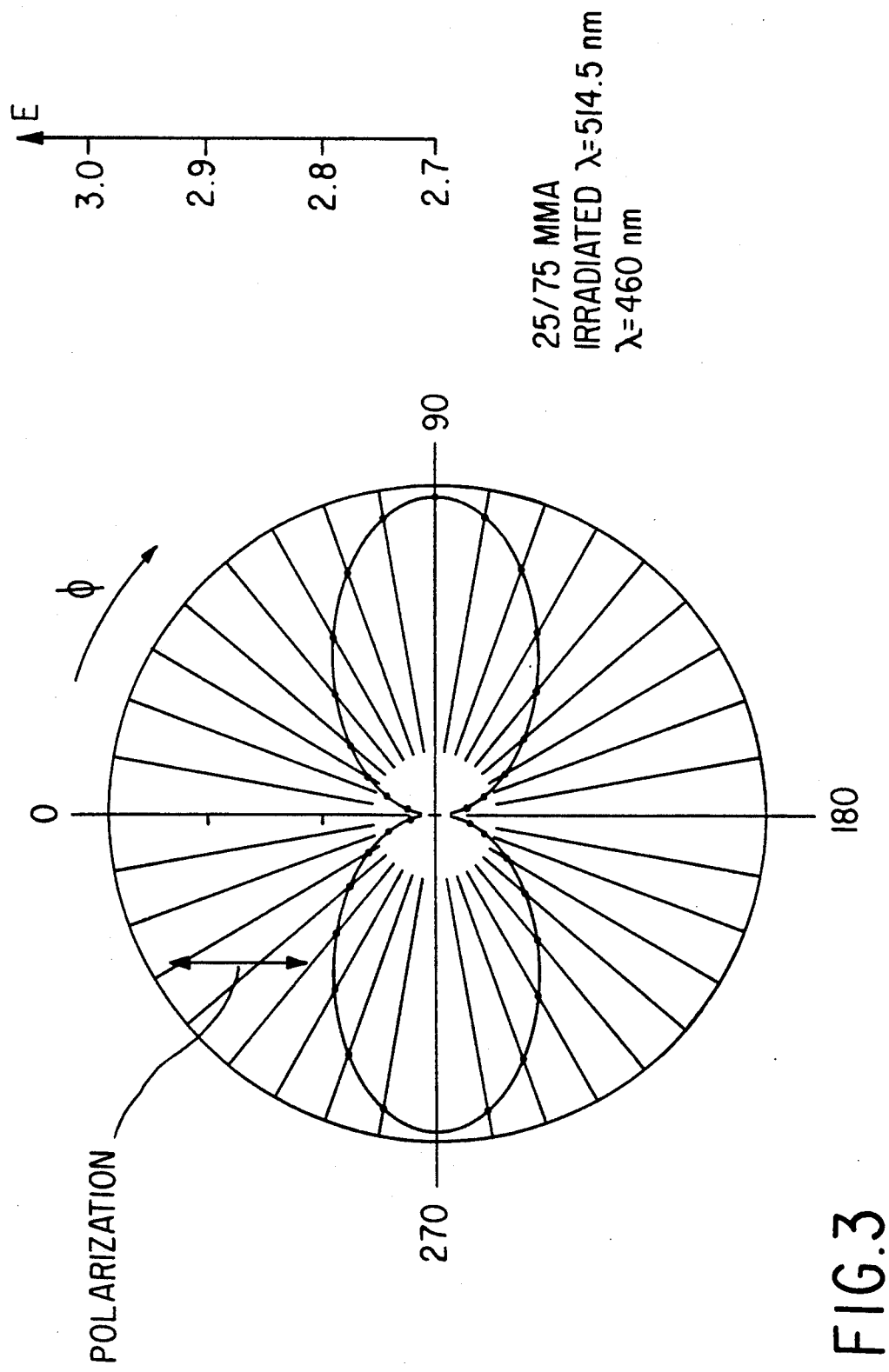
FIG. 3 illustrates a plot of extinction as a function of the angle of polarization.

If the difference in extinction is plotted as the function of the angle of polarization, the result is a dependency with maximum absorption perpendicular to the polarization of the irradiation wave (FIG. 3).

The course of the curve can be explained by a reduction in the number of molecules in the trans configuration, preferably in the direction of the irradiation polarization, and rearrangement of the segments into the cis configuration molecules during isomerization. In this case, the cis molecules, which absorb more readily at 460 nm, are rotated out of the direction of irradiation polarization. In addition to the anisotropic nature, higher values are found for extinctions, measured perpendicular to the irradiation polarization, than in the isotropic non irradiated amorphous state. This phenomenon cannot be explained simply by photoselection.

As expected, the optically induced dichroism is accompanied by an induced double refraction. At the same time the directions of the maximum and minimum refractive indices converge with those of the extreme values of extinction. Both refractive indices can be determined directly under polarized light in an Abbe refractometer.

Prior to irradiation, the isotropic refractive index $n_{is}=1.550$. After irradiation with 5 mW/cm$^2$ ($\lambda=514.5$ nm) $n_{parallel}=1.546$ and $n_{perpendicular}=1.556$; the induced double refraction was accordingly $\delta\ n_{ind}=10^{-2}$.

It is clear from this experiment that if the concentrations of isomerizable azobenzene units are high enough, severe changes in the (isotropic) orientation state can be produced in the amorphous system and it follows from this that modulations of the complex refractive index can also be produced. Consequently, stronger effects can be expected from systems that permit a uniform orientation of the dipole transition moments and thus provide optimal absorption conditions.

The device of the present invention is suitable for reversible optical data storage. Starting from image-formable material structures, the structure to be stored is irradiated by means of a coherent, in particular monochromatic light source, and the interference pattern, which is determined by means of the direction, amplitude and phase of the scattered light to be stored relative to a reference light source originating from the same light source, is registered and stored holographically in the device of the invention. The device is made of an amorphous polymer having photochromic properties, as the storage medium. The analogously stored information is read out by means of irradiating the film with coherent (monochromatic) light.

The process of reversible optical data storage is effected by means of a laser beam having any arbitrary cross-section, which produces in the oriented film (as the storage medium) a digital phase or amplitude structure. For specific applications (CD, synthetic holograms) the laser beam and storage medium are preferably moved relative to one another in a defined manner not only when storing information but also when reading information, while the intensity of the laser beam is suitably modulated.

Preferably, when storing by the digital method by means of a predetermined modulation of the intensity, a phase amplitude structure is produced in the storage medium. The modulation of intensity that is necessary for producing the phase structure can be determined with a computer. The reproduction is achieved by fully illuminating the obtained synthetic hologram with a reference wave. The density of information that can be achieved with the aid of the device of the present invention (expressed in lines per unit of length) with respect to all three coordinate axes is limited, on the one hand, by the linear dimensions of the storage medium and *) on the other hand. ,6 by ½ wave length of the light source used for storage Within the meaning of the above described possible applications, the device of the invention can be used, for example, for reversible, optical storage of information, for optical signal processing, for Fourier transformation and convolution, to produce imaging systems, to generate and store holograms, which, like lenses, have comparable imaging properties, and in coherent, optical correlation technology.

See H. J. Canlfield, Handbook of Optical Holography, Academic Press, 1979; H. M. Smith, Topics in Applied Physics, Vol. 20, Holographic Recording Materials, Springer Verlag, Heidelberg, New York, for applications of holography.

B. Preparation of Amorphous Polymers

In a stirred vessel, approximately 5-6.5 g of the monomers noted above are dissolved in 5 ml 1.4 dioxane and treated with 1 mole % 2,2'-azobis-(2,4-dimethyl) valeronitrile (based on the monomer). The monomer solution was degassed by multiple evacuations and purgings with helium and polymerized at 70° C.

The resulting polymers are precipitated with cold ether, dissolved in methylene chloride and precipitated in methanol. This process is repeated until no more monomers can be detected by thin layer chromatography. The purified polymer is dried at 30-40° C. under an oil pump vacuum. See table for results.

Structure of the polymers:

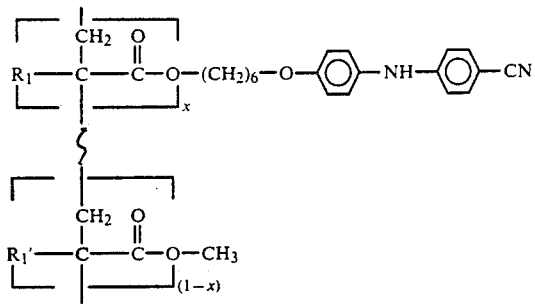

TABLE

| Example | R₁ | R'₁ | X | yield | Mw[1] g/mol | Tg (°C.) |
| --- | --- | --- | --- | --- | --- | --- |
| No. 1 | H | H | 0.25 | 30.4% of theor. | 10,100 | 30 |
| No. 2 | CH₃ | H | 0.25 | 65.34% of theor. | 27,700 | 35 |
| No. 3 | CH₃ | H | 0.01 | 44.0% of theor. | 47,800 | 27 |

[1]from SEC; calibration curve of polystyrene.

Obviously, numerous modifications and variations of the invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for reversible optical data storage, comprising:
a polymer film comprising an amorphous polymer capable of local variation in the molecule order of said polymer by light induced photochromic isomerism, using polarized light, whereby data is stored in said polymer film.

2. The device of claim 1, wherein said polymer film is macroscopically isotropic.

3. The device of claim 1, wherein said polymer film is macroscopically oriented.

4. The device of claim 1 where polymer film is on a transparent support plate.

5. The device of claim 1, wherein said device comprises a heat source means or a light source means, whereby said polymer film may be heated or the molecular order of said polymer film is varied.

6. The device of claim 1, wherein said polymer film is at a temperature below the glass temperature Tg of said polymer and the temperature is in the range of the shape-stable state of the polymer.

7. The device of claim 1, wherein said polymer is at a temperature above the glass temperature Tg of the polymer and in the range of the viscous, resilient state of said polymer.

8. The device of claim 5, wherein said device comprises means for erasing stored data by locally increasing the temperature of said polymer.

9. The device of claim 8, wherein said device further comprises means for cooling said locally heated polymer in an electrical or magnetic field or with a mechanical orientation process.

10. The device of claim 5, wherein said device further comprises means for erasing all data stored in said polymer by heating said entire polymer film.

11. The device of claim 10, wherein said device further comprises means for cooling said polymer film in the presence of an electrical or magnetic field or with a mechanical orientation process.

12. The device of claim 5, wherein said heat source means or light source means comprises a laser.

13. The device of claim 12, wherein the absorption properties of said polymer film enable information to be stored with a laser beam of suitable wavelength and suitable intensity and read out with a second laser beam having a different wavelength without disturbing the stored information.

14. The device of claim 1, wherein said photochromic isomerism is induced by an optical electrical or magnetic field.

15. The device of claim 3, wherein said polymer film is a macroscopically oriented film and is supported between two mutually parallel transparent support plates.

16. The device of claim 12, wherein said light source is a laser and wherein said amorphous polymer comprises a photochromic compound whose absorption properties correspond to the emission wavelength of said laser light source, wherein local photochromic isomerization is induced.

17. The device of claim 16, wherein said amorphous polymer comprises photochromic monomer units or said amorphous polymer comprises a blend of a photochromic low molecular weight compound and said amorphous polymer.

18. The device of claim 1, wherein data is stored in said polymer film by local variation in the molecular order of said polymer by photochromic isomerism, and wherein the density of said stored data with respect to the three coordinate axes is limited by the linear dimensions of said polymer film and by more than 4,000 lines per mm.* ,6 but limited by ½ of the wave length of the light source used.

19. A process for optical data storage, comprising the steps of:
(i) irradiating an object with coherent light from a coherent light source to produce scattered light from said object; and
(ii) contacting a polymer film comprising an amorphous polymer capable of local variation in the molecular order of said polymer by photochromic isomerization, with said scattered light and with a reference light source originating from said coherent light source, to form an interference pattern, said interference pattern being determined by the direction, amplitude and phase of said scattered light from said object relative to said reference light source, in said polymer film, whereby data is stored in said polymer film.

20. The process of claim 19, further comprising:
(iii) reading said stored data by irradiating said interference pattern in said polymer film with said coherent light or coherent light of other wave length and phase.

21. The process of claim 19, wherein said coherent light is monochromatic coherent light.

22. The process of claim 19, wherein said polymer film is macroscopically oriented.

23. The process of claim 22, wherein said stored data comprises a digital phase or amplitude structure produced in said macroscopically oriented polymer film.

24. A process for optical storage in accordance with claim 1 in which the transfer of information is effected by moving said coherent light and said film relative to each other.

25. The process of claim 24, wherein said reading step is conducted said coherent light and said polymer film relative to one another.

26. The process of claim 25, wherein the intensity of said coherent light is modulated.

27. The process of claim 24, wherein digital data is stored in said polymer film by modulating the intensity of said coherent light to produce a phase or amplitude structure in said polymer film.

28. The process of claim 26, wherein said modulation of said coherent light is controlled by a computer.

29. The process of claim 25, wherein the wavelength of said coherent light used for reading said stored data is outside the absorption maximum of said amorphous polymer capable of photochromic isomerization.

30. The process of claim 24, wherein the intensity of said coherent light is modulated to produce a phase or amplitude hologram structure in said polymer film and wherein said stored hologram structure is read by irradiating said hologram structure with said coherent light.

* * * * *

UNITED STATES PATENT AND TRADEMARK OFFICE
CERTIFICATE OF CORRECTION

PATENT NO. : 5,023,859
DATED : June 11, 1991
INVENTOR(S) : Manfred Eich et al

It is certified that error appears in the above-indentified patent and that said Letters Patent is hereby corrected as shown below:

Column 1, line 51, after "Crystals", delete "0".

Column 10, line 36, delete "*)";
          line 37, delete "on the other hand";
          line 37, delete ", 6"; and
          line 38, after "for storage" insert
              -- on the other hand.--.

Column 11, formula at top of page, change "NH" to --NN--;
          line 43, Claim 4, change "where" to --wherein--.
Column 12, line 36, delete "*,6".

Signed and Sealed this

Seventh Day of September, 1993

Attest:

BRUCE LEHMAN

Attesting Officer      Commissioner of Patents and Trademarks